United States Patent [19]

Elliston

[11] Patent Number: 4,494,415
[45] Date of Patent: Jan. 22, 1985

[54] LIQUID NITROGEN PUMP

[75] Inventor: Thomas L. Elliston, Fort Worth, Tex.

[73] Assignee: Hydra-Rig, Incorporated, Fort Worth, Tex.

[21] Appl. No.: 361,601

[22] Filed: Mar. 25, 1982

[51] Int. Cl.³ .................. F16H 21/22; F01B 1/02; F04B 1/12
[52] U.S. Cl. .......................... 74/44; 74/597; 74/571 R; 92/73; 92/147; 92/255; 417/269
[58] Field of Search .................. 74/44, 596, 597, 598, 74/570, 571 R, 571 M, 25; 417/415, 269; 92/169, 147, 146, 171, 261, 73, 161, 5 R, 255, 256

[56] References Cited

U.S. PATENT DOCUMENTS

| 1,024,817 | 4/1912 | Arnold | 74/597 |
| 1,404,550 | 1/1922 | Setz | 92/147 X |
| 1,836,498 | 12/1931 | Pielstick | 92/147 |
| 2,045,493 | 6/1936 | Radloff | 92/147 |
| 2,150,535 | 3/1939 | Wintzer | 92/147 |
| 2,246,392 | 6/1941 | Spreng et al. | 92/169 |
| 2,439,958 | 4/1948 | Anderson | 92/5 R |
| 2,524,273 | 10/1950 | Saler | 92/255 |
| 2,808,008 | 10/1957 | Keuffel | 92/147 X |
| 3,024,731 | 3/1962 | Heintz | 92/255 X |
| 3,279,279 | 10/1966 | Takebayashi | 74/597 |
| 3,760,694 | 9/1973 | Lieb | 74/44 X |

FOREIGN PATENT DOCUMENTS 1089383 3/1955 France ...................... 74/597

Primary Examiner—Allan D. Herrmann
Assistant Examiner—Arthur T. Quiray
Attorney, Agent, or Firm—Hubbard, Thurman, Turner & Tucker

[57] ABSTRACT

A triplex plunger pump for liquid cryogen service includes a power end frame comprising a casing formed of welded plate sections and elongated tubular members interconnected to form a main bearing support structure which minimizes the transmission of pump reaction forces to the casing outer walls. The power end frame is provided with removable guide sleeves for supporting respective cylindrical crossheads. The sleeves are retained in the power end frame in bores formed in spaced apart support plates. The crank or eccentric shaft is a multipart assembly including a cylindrical shaft having spaced apart splined sections which are interfittingly engaged with splines formed on removable eccentrics. The shaft main support bearings and the eccentric bearings are cylindrical roller bearing assemblies. The cryogenic fluid ends are supported in individual adaptor members which are removably mounted on the power end frame and include four spaced apart legs or tension rods to minimize the surface area available for conducting heat from the power end to the fluid end cylinders and for providing improved access to the coupling between the pony rods and the pump plunger rods.

17 Claims, 7 Drawing Figures

LIQUID NITROGEN PUMP

BACKGROUND OF THE INVENTION

1. Field of the Invention

The present invention pertains to a reciprocating plunger pump power end structure particularly adapted for a pump for pumping liquid nitrogen as well as other cryogenic fluids.

2. Background Art

The increasing use of cryogenic fluids in various applications has presented special problems in the design and application of pumping equipment for such fluids. Liquid nitrogen is one of the more popular cryogenic fluids because of its widespread availability in the earth's atmosphere, its chemical inertness and the relative ease with which it may be liquified. However, certain applications of liquid nitrogen present special problems in the design of pumping equipment.

One increasingly popular use of liquid nitrogen is in connection with enhanced recovery of subterranean petroleum deposits. The injection of nitrogen into geologic formations to stimulate recovery of crude oil, in particular, requires special pumping equipment. Reciprocating plunger type pumps are basically the only suitable type of equipment for handling and pumping liquid nitrogen under the flow rates and working pressures required in petroleum recovery operations. However, the problems associated with maintaining nitrogen in liquid form during certain phases of the pumping process, and the variation in pumping pressures and flow rates required during utilization of the fluid has been particularly difficult to deal with as regards the design of a suitable and reliable pump.

Liquid nitrogen is normally delivered to a well site in an insulated storage tank mounted on a servicing vehicle which also includes the requisite pumping equipment for discharging the nitrogen from the reservoir or storage tank to its end use. The liquid nitrogen must be adequately thermally insulated in the pumping equipment itself to prevent premature evaporation and the resultant erratic and dangerous pump operating conditions. Accordingly, the pump structure must be designed to effectively insulate the working or fluid end of the pump and to also deal with the thermal expansion and contraction caused by the extreme temperatures to which the pump is subjected. The pump fluid end must, of course, be effectively thermally isolated from the power end to prevent unwanted heat generated by mechanical friction in the power end from being transferred to the working fluid.

Moreover, pumping equipment for liquid nitrogen and certain other cryogenic fluids must be designed with good volumetric efficiency to prevent unwanted vaporization of the nitrogen on the suction stroke of the pump plunger. The control over the dimensional relationships necessary for good volumetric efficiency in the pump cylinder combined with the high working pressures and widely varying flow rates experienced by the pumping equipment has presented several problems in regard to the proper design of the power end of high pressure pumps for cryogenic fluids. The design of the power end must be such as to minimize elongation or compression of the pump mechanism so that dimensional control over the pump cylinder and plunger may be maintained for good volumetric efficiency while yet preventing mechanical interference of the working parts due to thermal expansion or contraction. In this regard, the design of a pump for pumping liquid nitrogen also presents a problem because of the relatively high compressibility factor for liquid nitrogen as compared with other liquids. Moreover, the widely varying flow rates required in some applications of pumping liquid nitrogen require special considerations in the design of the crankshaft and connecting rod arrangement, in particular, in regard to bearing loading, bearing configuration and lubrication.

The overall combination of design problems presented by the application of reciprocating plunger pumps to pumping liquid nitrogen and the like have been particularly vexatious for pump designers prior to the development of the present invention.

SUMMARY OF THE INVENTION

The present invention provides an improved reciprocating plunger pump power end particularly adapted for pumps for pumping liquid nitrogen and other cryogenic fluids having similar physical properties which must be pumped in liquid form at relatively high pressures and widely varying flow rates for applications such as injection into subterranean geologic formations. In accordance with an important aspect of the present invention, there is provided a multi-cylinder reciprocating plunger pump having a power end including a support frame, an improved multiple throw crankshaft arrangement mounted in the frame and multiple connecting rods or eccentric straps interconnected with respective pump plunger assemblies by way of an improved crosshead and crosshead guide configuration.

In accordance with another important aspect of the present invention, the pump power end structure is effectively thermally isolated from the fluid end by an improved adaptor arrangement which minimizes the surface area available for conductive transfer of heat from the power end to the fluid end and provides improved access to the coupling between the crosshead or pony rod and the pump plunger rod.

In accordance with still another improvement aspect of the present invention, there is provided an improved bearing support structure for the crankshaft main support bearings which is capable of withstanding the high tensile loads imposed on the pump frame without transferring high stresses through the frame outer shell or case. The main bearing support structure is provided by a plurality of elongated column members and tie rods or bolts extending from a fluid end mounting flange on the power end frame and including portions for supporting the main bearings of the crankshaft.

In accordance with yet another aspect of the present invention, there is provided an improved arrangement of a crankshaft eccentric cam together with main support bearings and eccentric or connecting rod bearings. Each eccentric strap or connecting rod is supported on a heavy duty roller bearing mounted on the crank eccentric or cam. The eccentric is, in turn, supported in heavy duty roller bearings disposed closely adjacent to and on opposite sides of the eccentric bearing. This arrangement not only gives adequate bearing support to distribute bearing loading and minimize crankshaft deflection, but provides a bearing arrangement which may withstand high loads and low speeds without failure due to loss of lubricant film such as is experienced with most sleeve-type bearings. The crank eccentric strap is also adapted to minimize dimensional change due to stresses imposed thereon in operation.

In accordance with yet another aspect of the present invention, there is provided a unique multipart crankshaft and eccentric configuration for single or multi-cylinder pumps including a splined cylindrical shaft on which may be slidably disposed one or more eccentrics or cams which may be positioned to provide a desired crank angle relationship. In particular, the splined crankshaft and eccentric combination is adapted for a multi-cylinder pump wherein any one of the eccentrics may be replaced if needed, or the shaft itself may be replaced without requiring replacement of the entire crankshaft and eccentric assembly.

In accordance with still another aspect of the present invention, there is provided an improved crosshead and crosshead guide assembly providing for greater bearing area and ease of replacement of the crosshead or crosshead guide, if needed.

The several problems associated with pumps for pumping liquid nitrogen, particularly for use in connection with petroleum recovery operations, have been overcome in providing the reciprocating pump power end structure of the present invention. Those skilled in the art will recognize that the various parameters that must be considered in the design of a plunger pump power end have been effectively dealt with in providing the overall combination of structural features of the present invention, and that a particularly synergistic effect has been achieved to minimize the problems associated with pumping cryogenic liquids such as liquid nitrogen. Those skilled in the art will recognize other superior features and advantages of the present invention upon reading the detailed description which follows in conjunction with the drawings.

DESCRIPTION OF THE PREFERRED EMBODIMENT

Figure 1:
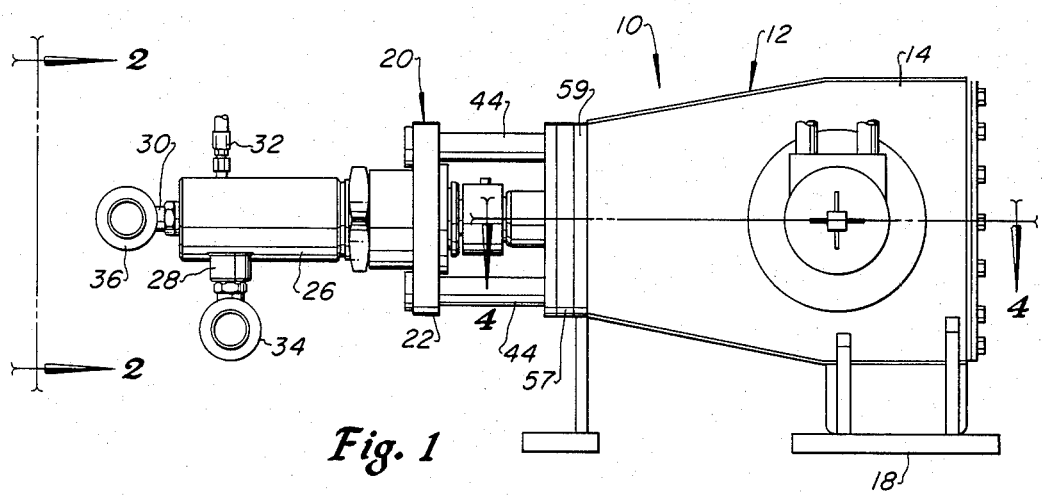
FIG. 1 is a side elevation of a triplex plunger pump for pumping liquid nitrogen and the like in accordance with the present invention.
Figure 2:
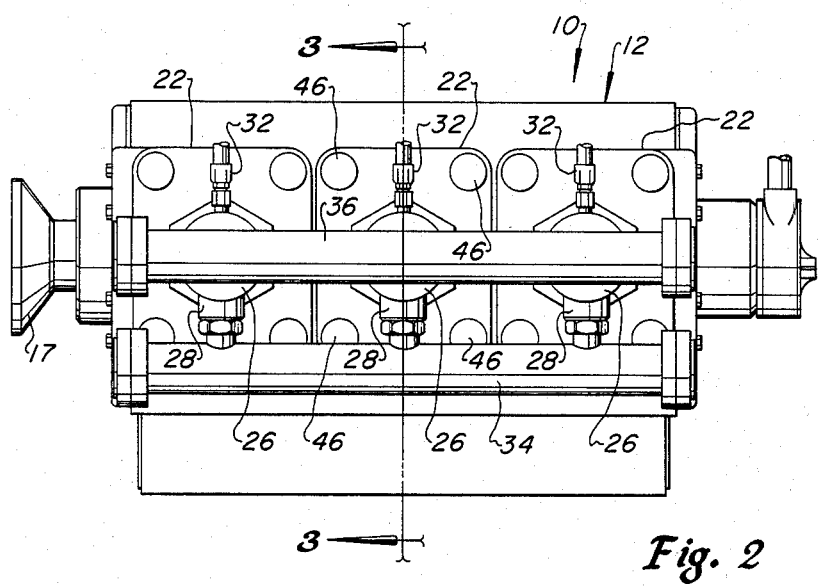
FIG. 2 is an end view taken from the line 2—2 in FIG. 1.
Figure 7:
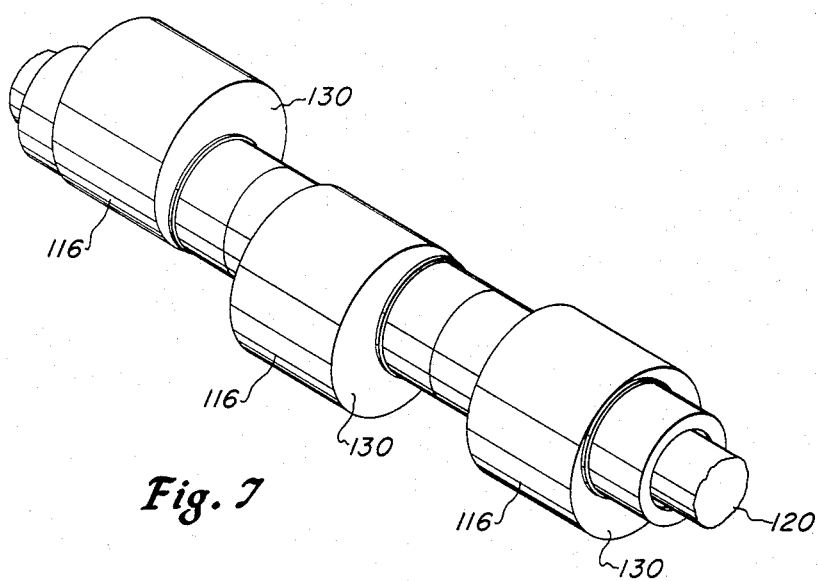
FIG. 7 is a perspective view of the crankshaft-eccentric assembly.

Referring to the drawings, and in particular, FIGS. 1 and 2, there is illustrated a multi-cylinder reciprocating plunger pump in accordance with the present invention and generally designated by the numeral 10. The pump 10 is characterized by a power end structure, generally designated by the numeral 12, and including a frame or housing 14. The frame 14 is adapted to support a rotatable crankshaft, to be described in further detail herein, having a distal end portion 16, FIG. 4, extending from one side of the housing and adapted to be drivably connected to a prime mover, not shown, by a coupling 17. The frame 14 includes a base portion or mounting pad 18 for mounting the pump 10 on a suitable support frame or the like, also not shown.

The pump 10 also includes a fluid end generally designated by the numeral 20 and comprising a plurality of support members or adaptor plates 22 which are removably mounted on the power end frame 14 in a manner to be described in further detail herein. The pump 10 is of the so-called triplex design comprising three individual fluid cylinder and plunger assemblies 26. The cylinder and plunger assemblies 26 are each supported on respective ones of the adaptors 22 and are provided with fluid inlet conduit portions 28, fluid discharge conduit portions 30, and fluid conduit bypass portions 32. The conduit portions 28 are each in communication with a common fluid inlet manifold 34 and the discharge conduit portions 30 are each in communication with a discharge manifold 36. Each of the bypass conduit portions 32 are arranged to be in communication with return conduits leading to a fluid reservoir, not shown.

The fluid cylinder and plunger assemblies 26 are of a type which are particularly adapted for pumping cryogenic fluids such as liquid nitrogen and do not in themselves form a part of the present invention. The cylinder and plunger assemblies 26 basically comprise an elongated cylinder member having a bore in which a plunger is reciprocably disposed and further including inlet and discharge valve means for admitting fluid to and discharging fluid from the expansible chamber formed by the cylinder bore and the plunger. The aforementioned cylinder members are preferably provided with fluid passageways for circulating the working fluid to maintain a fairly uniform temperature of the working parts at a temperature close to the nominal temperature of the fluid being pumped into and out of the cylinder assemblies 26. One source of commercially available cylinder and plunger assemblies of the general type described hereinabove is Chemical Seal and Packing Company, Houston, Tex.

Figure 3:
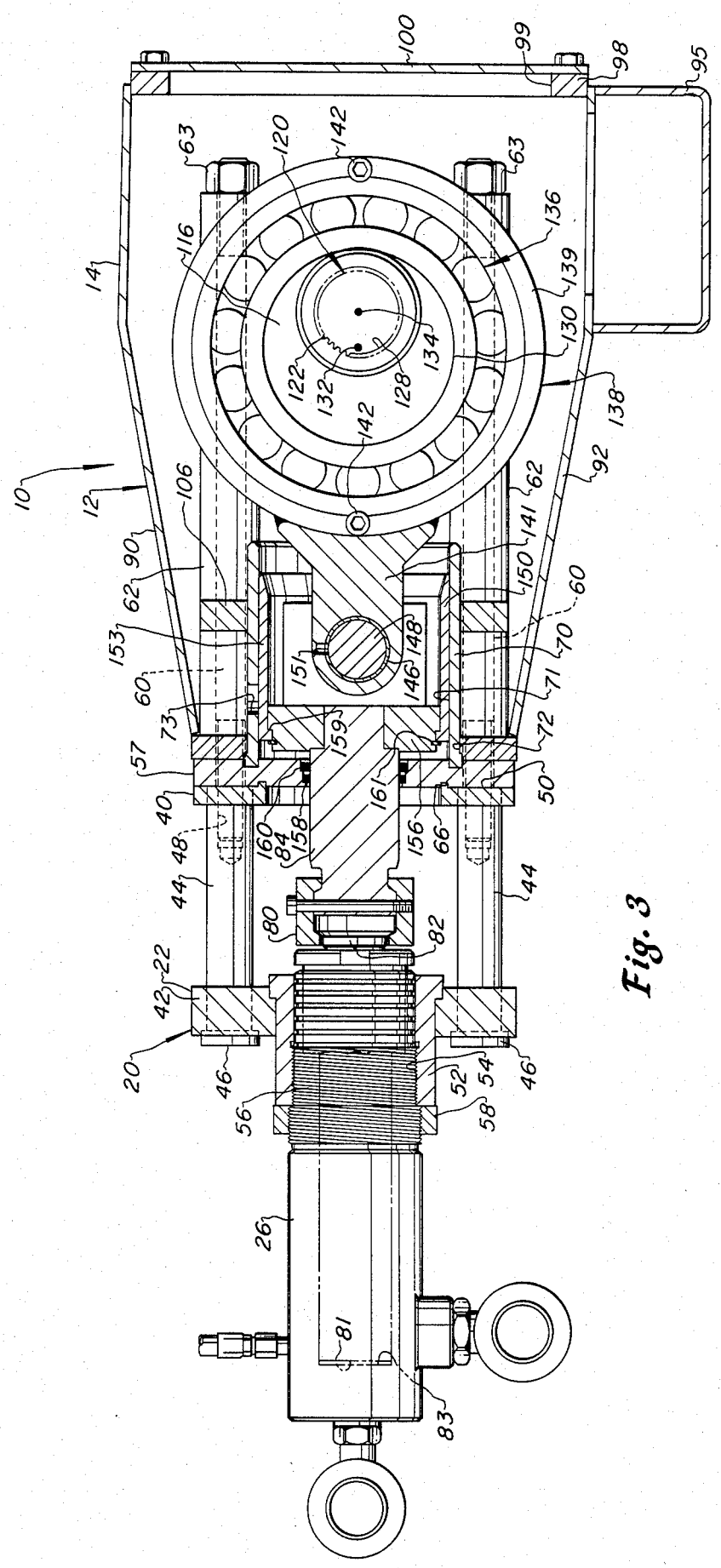
FIG. 3 is a section view taken along the line 3—3 of FIG. 2.

Referring to FIG. 3 also, the fluid end cylinder or support members 22 are each characterized by spaced apart support plates 40 and 42 which are interconnected by four cylindrical tension rod members 44 arranged in a generally rectangular pattern at the four corners of the respective support plates. The tension rods 44 are each provided with a head portion 46 suitably engaged with respective counterbores formed in the plate member 42. The tension rods 44 are each provided with threaded recesses 48 formed in the end opposite the head 46, which ends extend through and are flush with a mounting face 50 of the support plate 40. The support plates 42 are each provided with a mounting sleeve 52 including an internally threaded portion 54 adapted to be threadedly engaged with a cooperating threaded portion of the cylinder member 56 of the piston and cylinder assembly 26. The cylinder assembly 26 is adjustably mountable in the sleeve member 52 and is locked in a predetermined position by a locknut 58. The adaptors or cylinder support members 22 are each removably mounted against a retainer plate 57 which is sandwiched between the face 50 of the support member 40 and a transverse mounting flange 59 forming a part of the frame 14.

Figure 5:
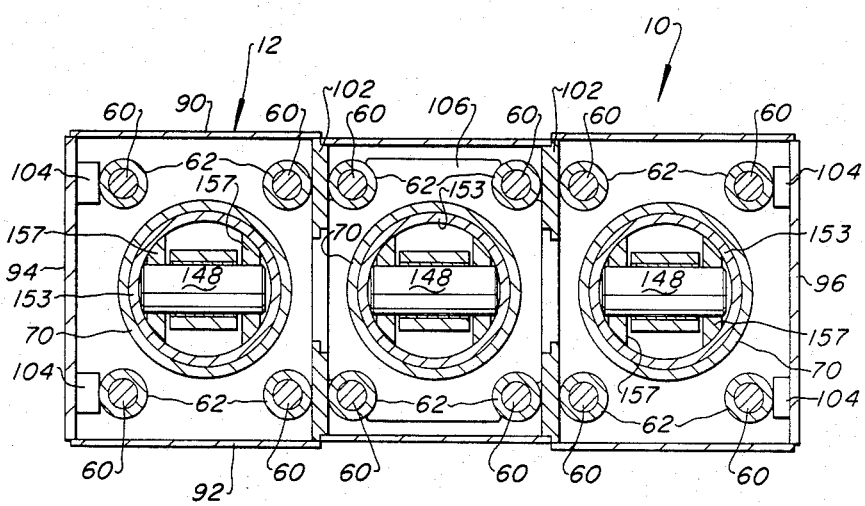
FIG. 5 is a detail section view taken along the line 5—5 of FIG. 4.

The adaptors 22 are each retained in assembly with the frame 14 by four elongated tie rods or bolts 60, as shown in FIGS. 3 and 5 of the drawings. The tie rods 60 are threaded at their opposite ends and each extend through respective elongated hollow tubular column members 62 comprising an integral part of the frame 14. The tie rods 60 are threadedly engaged with the cooperating threaded recesses 48 formed in the respective tension members 44.

Axial alignment of the adaptors 22 is provided, in part, by an annular locating rim 66 on each support plate 40 and which is suitably engaged in a cooperating locating groove formed in the retainer plate 57. Each plate 57, in turn, is located on one end of an elongated tubular sleeve 70 forming a crosshead guide, each of which is disposed in cooperating bores 72 formed in the flange 59. Accordingly, each of the adaptors 22 is individually located on the frame 14 with respect to its associated connecting rod or eccentric strap and crosshead mechanism and may be individually removed from the frame 14 by removal of the four associated tie rods 60. Moreover, the structural arrangement of the adaptor 22 is particularly advantageous for a cryogenic pump in that the total surface area of structure interconnecting the frame 14 and the cylinder assembly 26 is relatively small, being that of a cross-sectional area of the tension rods 44. Accordingly, very little conductive surface area is available for the transfer of heat from the frame 14 to the cylinder assembly 26. The arrangement of the four spaced apart tension rods 44 is also advantageous in that there is provided relatively easy access to a coupling 80 between a piston or plunger rod 82 of the cylinder assembly 26 and the pony or crosshead rod 84 of the power end structure 12.

Those skilled in the art will appreciate that not only may the adaptors 22 be easily removed from the pump power end structure, but the cylinder and plunger assemblies 26 may in themselves be easily removed from the respective adaptors 22 by removal of split cylindrical clamp portions of the coupling 80 and unthreading of the cylinder and piston assembly 26. The end clearance of the plunger within the cylinder 26 may be adjusted as desired by location of the cylinder member 56 with respect to the sleeve 52.

Further structural features of the power end frame 14 will now be described in conjunction with FIGS. 3, 4 and 5 of the drawings. Frame 14 is characterized as a generally hollow casing having a top wall 90, a bottom wall 92 and spaced apart sidewalls 94 and 96 which are each contiguous with the transverse end wall formed by the flange 59 and a transverse end wall 98 having an opening 99 which is covered by a removable cover member 100.

Figure 6:
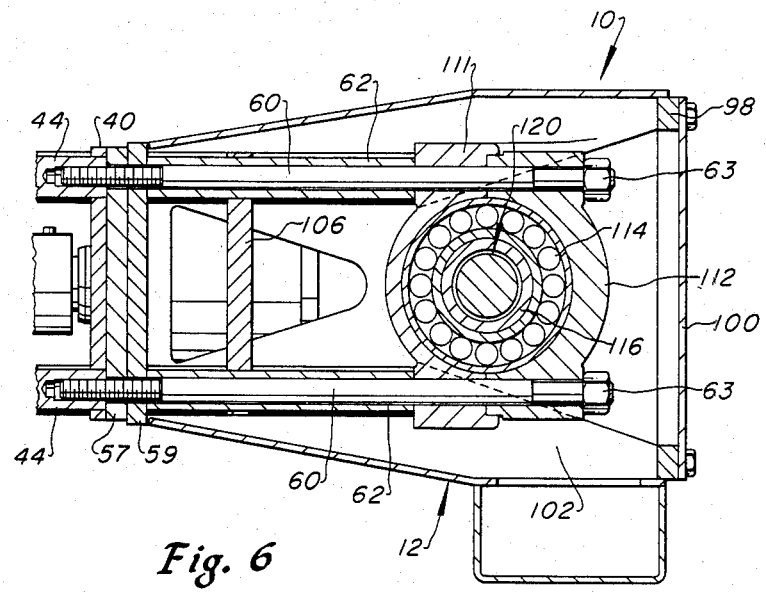
FIG. 6 is a detail section view taken generally along line 6—6 of FIG. 4.

The frame 14 is provided with three spaced apart sets of tubular column members 62 wherein each set comprises four of the column members spaced apart from each other in a rectangular pattern coinciding with the arrangement of the tension rods 44. As shown in FIGS. 3, 4 and 6, the frame 14 is also characterized by intermediate platelike web members 102 which extend from the flange 59 to the end wall 98 and are interposed between each of the outboard sets of column members 62 and the middle or intermediate set of column members. Each of the web members 102 is contiguous with the adjacent column members and is preferably welded thereto along contacting surfaces. The web members 102 are welded along their peripheral edges to the flange 59, the end wall 98, and the top and bottom walls 90 and 92, respectively. The frame 14 is also provided with elongated web members 104, interposed between the outside pair of column members 62 of each outboard set of column members and between the sidewalls 94 and 96, respectively. The web members 104 are suitably welded along their contiguous edges with the column members 62 and the respective sidewalls 94 and 96. The web members 104 may be formed as integral parts of the sidewalls 94 and 96 also. The frame 14 is still further characterized by transverse platelike webs or support members 106 and 108, each of which are provided with a cylindrical bore 110 for receiving in supportive relationship respective ones of the crosshead guides 70. The bores 72 and 110 are dimensioned to receive the crosshead guides 70 in slidable but close fitting relationsip so that the guides may be easily removed from the frame 14 upon disassembly of the frame by removal of the adaptors 22 and the plate 57. The webs 106 and 108 are suitably configured so that the column members 62 may extend continuously through the respective webs.

Figure 4:
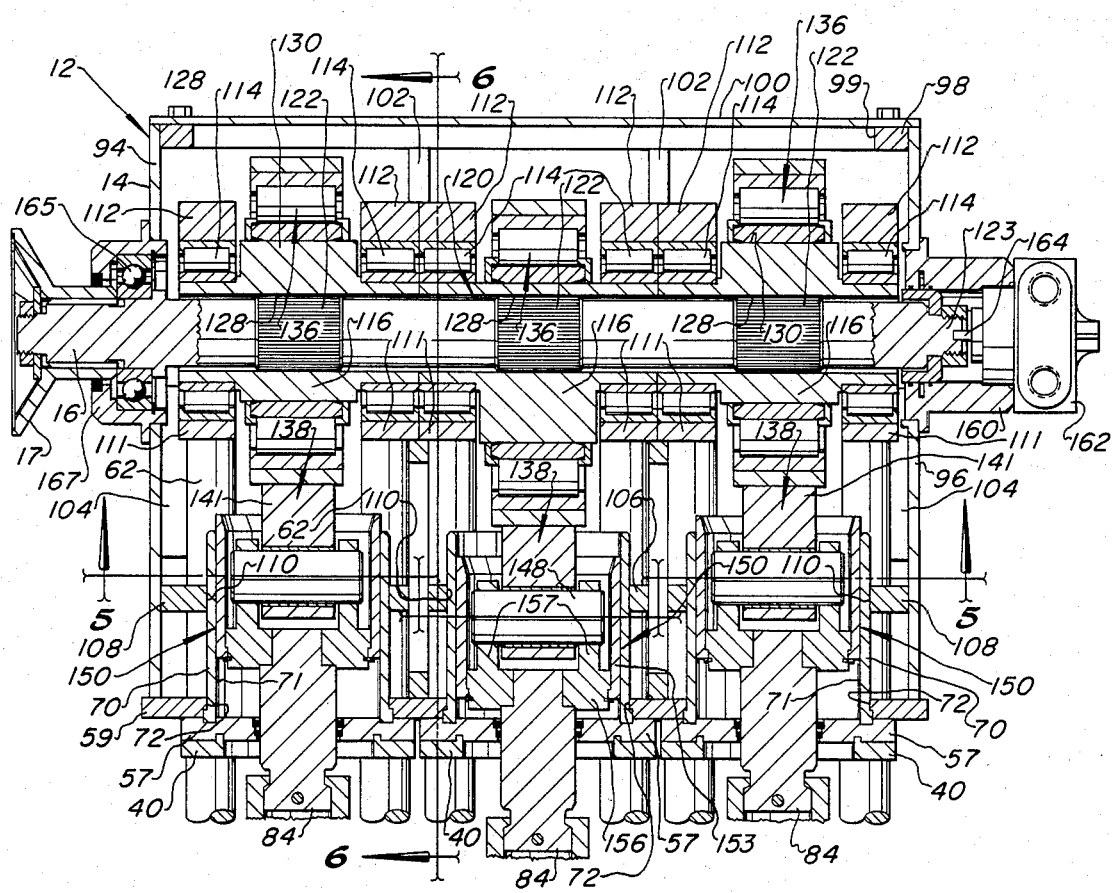
FIG. 4 is a section view taken generally along the line 4—4 of FIG. 1.

Referring still further to FIGS. 3 and 4, as well as FIG. 6, the frame 14 is provided with a plurality of spaced apart bearing support blocks 111 and removable cap members 112. An assembly of a block 111 and a cap 112 is adapted to journal the outer race of respective roller bearing assemblies 114 which rotatably journal respective cam or eccentric members 116. The bearing blocks 111 are each supported by adjacent vertically aligned pairs of the column members 62, as shown by way of example in FIG. 6, and are suitably welded to the distal end faces of the column members to form a unitary structure for supporting the pump crankshaft assembly to be described in further detail herein. The bearing caps 112 are retained in assembly with the blocks 111 by the tie rods 60 and respective associated retaining nuts 63. Since each pair of vertically aligned column members 62 comprise supports for the main bearings 114 of the crankshaft assembly of the pump 10, the reaction forces imposed on the shaft by the pumping action of the plungers in the cylinder assemblies 26 are transmitted to the tie rods 60 to primarily place the rods in tension. Some of the loading on the column members is, of course, transmitted to the web members 102 and 104 and distributed between adjacent sets of column members which are interconnected by respective ones of the web members. However, the support provided by the sets of column members 62 substantially reduces stress on the top and bottom walls 90 and 92 and substantially reduces the stress which must be endured by the sidewalls 94 and 96.

Moreover, by tightening the retaining nuts 63 to a suitable torque, the tie rods 60 may be prestressed in tension such that even under the maximum beam loading on the crankshaft assembly there is, in effect, no elongation of the frame 14 due to the forces exerted in pumping the liquid cryogen through the cylinder assemblies 26. This arrangement is particularly advantageous for pumps subjected to relatively high working pressures and wherein close control over the clearance volume in the working cylinder must be maintained at the maximum working pressure so that, upon reaching top dead center, the pump plungers have displaced essentially all of the fluid from the working fluid chambers and very little fluid is left in the chambers to expand or flash to vapor. The generous cross-sectional area of the rod 84 and the eccentric strap end portion described further herein also contributes to minimizing the clearance volume in the working fluid chambers. Considering the relatively high compressibility of liquid cryogens, such as liquid nitrogen, together with the high working pressures required of a pump such as the pump 10, it is important to minimize the elongation of the power end frame 14 in operation of the pump.

The frame 14 is also provided with a lubricant sump portion 95 disposed under the bottom wall 92. The frame 14 is preferably formed of steel or aluminum plate of suitable thickness to form a unitary structure of members which are welded together to form a casing or shell, as well as a substantially rigid bearing support structure for the crankshaft and crosshead mechanism. Moreover, the frame 14 may be easily fabricated of commercially available mill shapes such as flat plate and elongated tubing.

The pump 10 also enjoys an improved combination of crankshaft, connecting rod or eccentric strap and crosshead arrangement which will now be described in conjunction with FIGS. 3 through 7. Referring particularly to FIG. 4, the pump main crankshaft is characterized by an elongated generally cylindrical shaft member 120, including the distal end portion 16, which is provided with three spaced apart sets of axially extending splines 122. The splines 122 are preferably of a conventional configuration such as an SAE involute profile. The splines 122 are interfitted with cooperating splines formed in central axial bores 128 of each of the eccentrics 116. As shown by way of example in FIG. 3, the eccentrics 116 are provided with cylindrical cam or eccentric support portions 130 having a radius center 132 displaced from the central axis 134 of the hub bore 128. The axis 134 is coincident with the central longitudinal axis of rotation of the shaft 120. The cam 130 of each of the eccentrics 116 comprises a cylindrical support surface for a roller bearing assembly 136 for an eccentric strap or connecting rod 138. The roller bearing assembly 136 is retained on the cam 130 by suitable means such as spaced apart retaining rings, not shown.

Each of the eccentrics 116 is arranged on the shaft 120 to provide suitable angular spacing of the eccentrics with respect to the axis of rotation of the shaft to minimize the unbalanced forces due to the reciprocating and rotating parts and to minimize the pressure pulsations in the discharge manifold. In a triplex plunger pump, for example, the preferred angle of displacement of each of the eccentrics is 120°. By providing splines on the shaft 120 and in the bore 128 having 27 teeth, for example, the eccentrics 116 may be positioned on the shaft 120 to be displaced 120° out of phase with each other. Moreover, each of the eccentrics may be removed and replaced, if necessary, without requiring the replacement of the entire shaft and eccentric assembly. This arrangement also provides for modular construction of duplex, quaduplex, quintuplex pumps and so on, by simply adding the requisite number of sets of splines 122 to a suitable shaft length.

The eccentrics 116 are suitably journalled in the frame 14 by the spaced apart bearing blocks 111 and caps 112 which are adapted to support the outer races of the respective bearing assemblies 114. Each bearing assembly 136 rotatably supports a connecting rod or eccentric strap 138 which is suitably secured in assembly with the outer race of the bearing assembly 136 by respective socket head screws 142, FIG. 3. The eccentric straps 138 each include a cylindrical rim portion 139 welded to a crosshead end portion 141. The end portion 141 is provided with a bore in which a cylindrical bushing or sleeve bearing 146 is disposed and journals a cylindrical pin 148. The pin 148 is connected to an improved multipart crosshead assembly 150 which is slidably disposed in the bore 71 which forms an arcuate bearing surface in the crosshead guide 70. A passageway 73 is formed in the top side of each of the guides 70 and intersects the bore 71 to provide for entry of lubricant into the bore. In a somewhat similar manner a passageway 151 is provided in the eccentric strap end portion 141 and intersecting the bore of the bearing 146 to provide for introduction of lubricant to the bearing.

Referring to FIGS. 3, 4 and 5, the crosshead assembly 150 includes a cylindrical sleeve part 153 to which is removably fitted a head part 156. The head part 156 comprises a cylindrical member which is slidably fitted within a bore formed in the sleeve 153. As shown in FIG. 4, each head part 156 includes two axially extending spaced apart bosses 157 which support pins 148. The sleeves 153 and head parts 156 are secured against relative movement by cooperable shoulder portions 159 and retaining rings 161, as indicated by way of example in FIG. 3. The head parts 156 are each fixed to one end of a pony rod 84. Each rod 84 extends through a suitable bore in the plate 57 which is provided with a suitable wiper 158 and seal 160. The crosshead sleeve part 153 serves as a bearing or guide member and the substantial forces exerted by the pumping action of each eccentric strap 138 is transmitted by the strap end portion 141 to the rod 84 through the head part 156.

Referring again to FIG. 4, an end 123 of the shaft 120 extends into a removable cover member 160 mounted on the sidewall 96. The cover member 160 is adapted to support an oil pump, generally designated by the numeral 162, which includes a shaft having a drive tang 164 drivably engaged with a cooperating slot formed in the shaft end 123. The opposite shaft end 16 includes a portion suitably journalled in a bearing assembly 165 to minimize deflection of the shaft due to any overhanging loads imposed thereon by power transmission means, not shown, connected to the coupling 17. The bearing 165 is supported in a cover member 167 suitably mounted on the sidewall 94. The oil pump 162 is adapted to provide pressure lubrication to each of the bearings 114 and 136 by suitable passages, not shown, formed in the shaft 120 and leading to the eccentrics 116. Jet circulation of oil within the interior of the frame 14 may be suitably directed to assure adequate lubrication of the bearings 146 and the crosshead assemblies 150. Since the bearing 146 is subjected to oscillating motion only, it is able to withstand higher forces and maintain a lubricant film than is the case with the eccentric bearings 114 and 136. Accordingly, by providing a roller bearing assembly 136 as the main eccentric or connecting rod bearing and by providing dual sets of cylindrical roller bearings 114 as the main shaft support bearings for the shaft 120 and associated eccentrics, a more reliable crankshaft bearing arrangement is provided to withstand the high working pressures of the pump.

From the foregoing description, those skilled in the art will recognize that the power end 12 together with the arrangement of the adaptors 22 provides a superior reciprocating plunger pump design which is particularly adapted for use as a cryogenic pump for pumping liquid cryogens such as liquid nitrogen. The unique frame structure including the column members 62 and the interconnecting web members 102 and 104 together with the tie rods 60 provides for a main bearing support structure which minimizes any elongation of the frame as a result of reaction forces imposed on the power end by the pressure of the working fluid acting against the transverse end faces of the pump plungers. The arrangement of the frame 14 disclosed herein, minimizes the stress imposed on the casing walls of the pump and provides a unique welded structure which is rigid yet light weight and is found to be highly suitable for pumps subjected to such severe service as pumping liquid nitrogen at pressures ranging from 7,000 to 10,000 psi and at shaft speeds of from 50 to 900 rpm. Further in this regard, the provision of the eccentrics 116 and the arrangement of the roller bearings 114 and 136 provides generous support for the loads imposed on the shaft and the eccentrics.

The crosshead guides 70 may be easily replaced, if needed, by removal of the adaptors 122 and the plate 57 whereupon each of the guides may be slid out of the support formed by the flange 59 and the webs 106 and 108. The arrangement of the shaft 120 and the eccentrics 116 is also advantageous, as described hereinabove, in that the components making up the crankshaft or eccentric shaft, as referred to in the pump art, may be replaced piece by piece without replacing the entire shaft assembly. The multipart crosshead assembly 150 is also advantageous in that the cylindrical bearing sleeve part 153 or the head part 156 can be replaced without replacing the entire crosshead.

In order to minimize the adverse effects of poor volumetric efficiency of the pump 10, in initially setting up the pump, each cylinder assembly 26 is mounted with a predetermined clearance between the top end of the plunger and the cylinder head by stroking each of the eccentrics 116 and associated crossheads until the connecting rod is in the top dead center position such as the position illustrated for the connecting rod 138 shown in FIG. 3. The locknut 58 is loosened so that the cylinder member 56 may be rotated and, with the piston rod 82 and the pony rod 84 connected to each other by way of the coupling 80, the cylinder is rotated until a predetermined end clearance is provided between the end face 81 of the plunger and the face 83 of the head or blind end of the bore of cylinder member 56. This predetermined clearance may be obtained by suitable markings on the end of the plunger rod 82 that protrudes from the cylinder assembly 26. With the cylinder member 56 correctly oriented so that the inlet and discharge conduits are in proper position, the locknut 58 is then tightened to secure the cylinder assembly in its working position on the adaptor 22.

The aforementioned end clearance is determined to be such that when the cylinder assemblies 26 reach a steady state operating condition, in pumping liquid nitrogen, that a minimum clearance between the faces 81 and 83 is provided without the possibility of interference when the piston reaches top dead center. In order to assure that this minimum clearance is maintained to displace substantially all of the liquid nitrogen from the cylinder chamber during a piston stroke, the advantageous arrangement of the main bearing supports for the power frame minimizes or substantially eliminates any elongation of the frame under the substantial forces exerted during the pumping action. The generous proportions of the eccentric straps 138, the crossheads 150 and the pony rods 84 are such that minimum deflection of these components is experienced also. The bearing assemblies 114 and 136 may be provided with zero radial play or very slightly preloaded at assembly to minimize any play in the eccentric and main bearing arrangement. The generous proportions of the bearings also minimize deflection of the bearings themselves under maximum loads.

Although a specific embodiment of the liquid nitrogen pump in accordance with the present invention has been described in detail hereinabove, those skilled in the art will appreciate that various modifications and substitutions may be made without departing from the scope and spirit of the present invention as defined by the appended claims.

What I claim is:

1. A power end assembly for a multi-cylinder reciprocating plunger pump comprising:
   a frame including main bearing support means comprising a plurality of spaced apart bearing support blocks and removable bearing cap members secured to each of said support blocks, respectively;
   a crankshaft assembly supported in said frame including a plurality of eccentrics, each of said eccentrics supporting a reciprocating connecting rod;
   roller bearing assemblies supported in each of said support blocks for journalling said eccentrics, respectively, directly adjacent to and on opposite sides of each of said connecting rods; and
   said crankshaft assembly is further characterized by a separable crankshaft section, and each of said eccentrics has a hub portion removably mounted on and drivenly keyed to said crankshaft section whereby said bearing assemblies can be assembled in supportive relationship to each of said eccentrics on opposite sides thereof, respectively.

2. A power end assembly for a multi-cylinder reciprocating plunger pump comprising:
   a frame including a casing defined by spaced apart top and bottom walls, longitudinal sidewalls, and a first end wall defining a transverse flange, said frame including main bearing support means extending from said first end wall and including means defining a plurality of spaced apart bearing support blocks and spaced apart pairs of elongated column members, each pair of column members including a support block;
   a crankshaft assembly supported in said frame including a plurality of eccentrics, each of said eccentrics supporting a reciprocating connecting rod;
   roller bearing assemblies supported in each of said support blocks for journalling said eccentrics, respectively, on opposite sides of each of said connecting rods; and
   said crankshaft assembly is further characterized by a separable crankshaft section, and each of said eccentrics has a hub portion removably mounted on and drivenly keyed to said crankshaft section whereby said bearing assemblies can be assembled in supportive relationship to each of said eccentrics on opposite sides thereof, respectively.

3. The pump power end assembly set forth in claim 2 wherein:
   said bearing support blocks include removable cap portions, and said bearing support means includes a plurality of elongated tie rods extending from said flange to said cap portions for securing said cap portions to respective ones of said bearing support blocks.

4. The pump power end assembly set forth in claim 3 together with:
   a plurality of adaptor members secured to said frame, each of said adaptor members including means for supporting a fluid cylinder and plunger assembly.

5. The pump power end assembly set forth in claim 4 wherein:
   said adaptor members are secured to said frame by said tie rods.

6. The pump power end assembly set forth in claim 5 wherein:

each of said adaptor members includes spaced apart transverse plate portions interconnected by a plurality of spaced apart and generally parallel rod portions, the space between said rod portion providing access to coupling means interconnecting a plunger rod of said cylinder and plunger assembly with a crosshead rod reciprocably supported on said power end assembly.

7. The pump power end assembly set forth in claim 2 wherein:

said pump power end assembly includes at least three sets of spaced apart pairs of column members extending from said flange including an intermediate set of column members flanked by two opposed sets of column members, and said frame includes at least two generally planar webs extending between and contiguous with adjacent pairs of column members of adjacent sets, said webs being welded to said contiguous column members.

8. The pump power end assembly set forth in claim 2 wherein:

said column members comprise elongated hollow tubes and said frame includes elongated tie rods extending through the interior of respective ones of said column members from said flange to said bearing block portions, and means for tensioning said tie rods so as to compressively stress said column members.

9. The pump power end assembly set forth in claim 7 wherein:

opposed edges of said webs are welded to opposed ones of said walls of said casing.

10. The pump power end assembly set forth in claim 2 wherein:

each of said eccentrics includes a cylindrical cam having its axis of rotation eccentric to the axis of rotation of said crankshaft section and said cams each support a roller bearing assembly for a connecting rod supported by said cam.

11. In a multi-cylinder reciprocating plunger pump a power end assembly comprising:

a frame including a casing defined by spaced apart top and bottom walls, longitudinal sidewalls, and a first end wall defining a transverse flange, said frame including main bearing support means extending from said first end wall and including means defining a plurality of spaced apart bearing support blocks for supporting a plurality of main bearings for a rotatable crankshaft assembly;

a plurality of cylindrical sleeves extending from said flange into the interior of said casing;

a crosshead member slidably guided in each of said sleeves, respectively;

said frame including means for supporting said sleeves including transverse support members spaced from and generally parallel to said flange, each of said support members including a bore for receiving a sleeve in supportive relationship thereto, said flange including a plurality of bores aligned with respective bores in said support members for supporting respective ones of said sleeves; and a removable cover plate secured to said flange for retaining said sleeves in said bores in said flange.

12. In a multi-cylinder reciprocating plunger pump a power end assembly comprising:

a frame including a casing defined by spaced apart top and bottom walls, longitudinal sidewalls, and a first end wall defining a transverse flange, said frame including main bearing support means extending from said first end wall and including means defining a plurality of spaced apart bearing support blocks for supporting a plurality of main bearings for a rotatable crankshaft assembly, said support blocks including removable cap portions, and said bearing support means including a plurality of elongated tie rods extending from said flange to said cap portions for securing said cap portions to respective ones of said support blocks;

a plurality of adaptor members secured to said frame by said tie rods, each of said adaptor members including means for supporting a fluid cylinder and plunger assembly, each of said adaptor members including spaced apart transverse plate portions interconnected by a plurality of spaced apart and generally parallel rod portions, the space between said rod portions providing access to coupling means interconnecting a plunger rod of said cylinder and plunger assembly with a crosshead rod reciprocably supported on said power end assembly;

a plurality of cylindrical sleeves extending from said flange into the interior of said casing;

a crosshead member slidably guided in each of said sleeves, respectively;

said frame including means for supporting said sleeves including transverse support members spaced from and generally parallel to said flange, each of said support members including a bore for receiving a sleeve in supportive relationship thereto;

a plurality of bores formed in said flange and aligned with respective bores in said support members for supporting respective ones of said sleeves; and a removable cover plate secured to said flange for retaining said sleeves in said bores in said flange.

13. A power end assembly for a multi-cylinder reciprocating plunger pump comprising:

a frame including a casing defined by spaced apart top and bottom walls, longitudinal sidewalls, and a first end wall defining a transverse flange, said frame including main bearing support means for supporting a plurality of main bearings for a rotatable crankshaft assembly;

a plurality of cylindrical crosshead guide sleeves;

means on said frame including said flange for supporting said sleeves in such a way that said sleeves extend from said flange into the interior of said casing;

crosshead members slidably disposed in said sleeves, respectively, said crosshead members each including means forming bearing surfaces for supporting said crosshead members for reciprocation in said sleeves; and plate means secured to said flange for retaining said sleeves in their supported positions on said frame whereby said sleeves can be inserted in and removed from said casing at said flange and said crosshead members can be inserted in and removed from said sleeves at said flange upon removal of said plate means from said flange.

14. The power end assembly set forth in claim 13 including:

a crosshead rod extending from each of said crosshead members and extending from said flange at one end of said frame;

a plurality of adaptor members secured to said flange, each of said adaptor members including spaced apart transverse plate portions interconnected by a plurality of spaced apart and generally parallel rod portions, the space between said rod portions providing access to one end of said crosshead rod for coupling and uncoupling said crosshead rod with respect to a pump plunger rod.

15. The pump power end assembly set forth in claim 13 wherein:
said crosshead members each comprise cylindrical sleeve members including said bearing surfaces formed thereon, and head parts adapted to be releasably secured to said sleeve members, respectively, whereby forces exerted on said crosshead rods are transmitted through said head parts to connecting rod pins supported on said head parts, respectively.

16. A power end assembly for a high pressure reciprocating plunger pump comprising:
a frame including bearing support means for rotatably supporting a crankshaft, said frame including spaced apart top and bottom walls, sidewalls and a transverse flange defining a casing, means forming a plurality of bores in said casing for receiving respective crosshead guide members forming crosshead bearing means; and
a plurality of separate adaptor members mounted on said frame, each of said adaptor members comprising spaced apart parallel support plates interconnected by a plurality of spaced apart tension rods for supporting a cylinder and plunger assembly in substantially coaxial alignment with respective ones of said crosshead guide members, and to provide a space between said rods for access to coupling means interconnecting a plunger rod of said cylinder and plunger assembly with a crosshead rod reciprocably supported on said power end assembly.

17. The power end assembly set forth in claim 16 together with:
a retainer plate secured between each of said adaptor members and said flange and adapted to retain said crosshead guides in said casing, said retainer plate including seal means for engaging a pony rod connected to a crosshead reciprocably disposed in each of said crosshead guides.

* * * * *